Dec. 1, 1964  F. N. PIASECKI  3,159,806
HIGH SPEED TOW SONAR SYSTEM
Filed May 6, 1960  3 Sheets-Sheet 1

INVENTOR
Frank N. Piasecki

BY Mason, Fenwick & Lawrence
ATTORNEYS

Dec. 1, 1964    F. N. PIASECKI    3,159,806
HIGH SPEED TOW SONAR SYSTEM
Filed May 6, 1960    3 Sheets-Sheet 2

INVENTOR
Frank N. Piasecki

BY Mason, Fenwick & Lawrence
ATTORNEYS

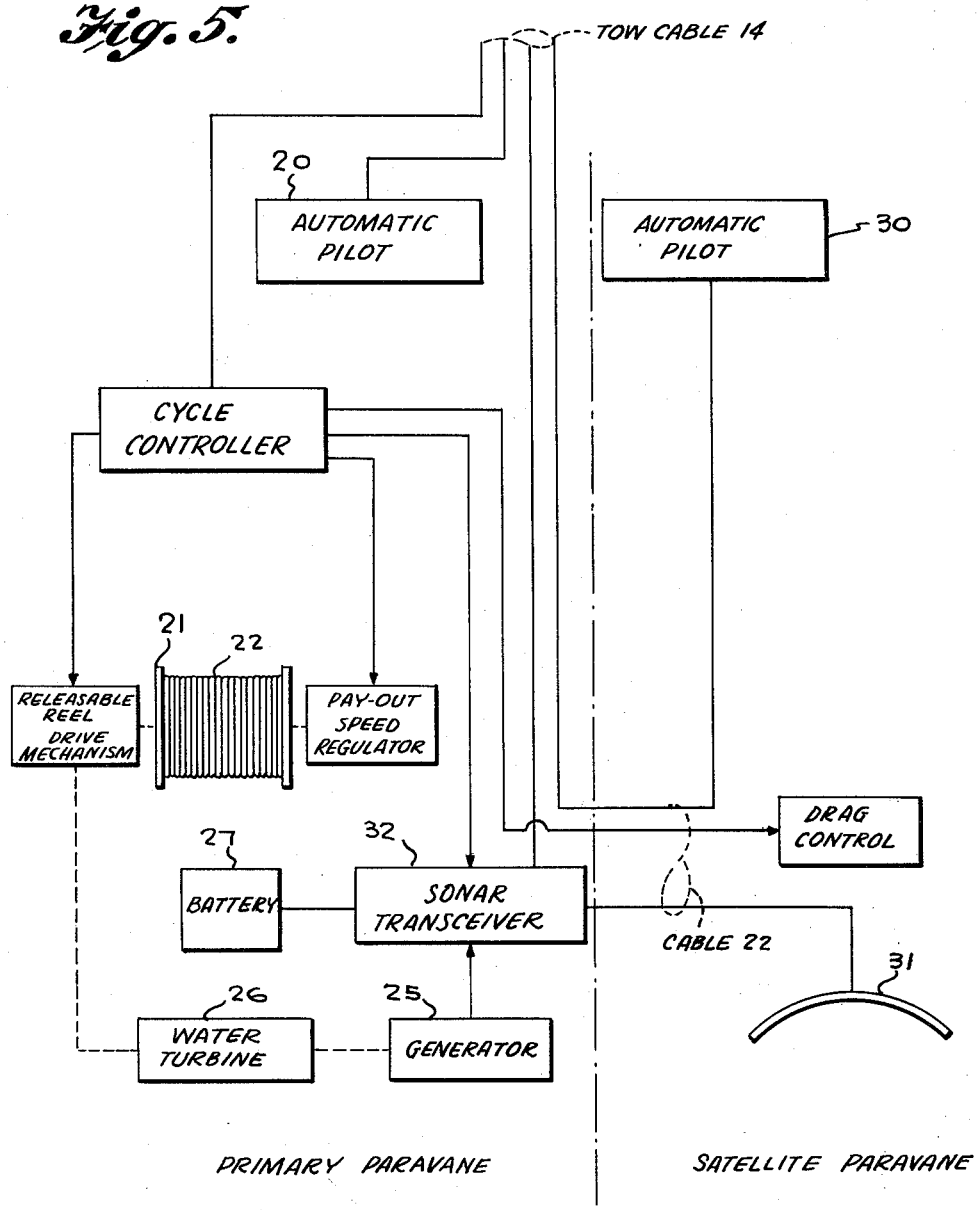

United States Patent Office 3,159,806
Patented Dec. 1, 1964

3,159,806
HIGH SPEED TOW SONAR SYSTEM
Frank N. Piasecki, Tunbridge Road, Haverford, Pa.
Filed May 6, 1960, Ser. No. 27,454
6 Claims. (Cl. 340—3)

The present invention relates in general to methods and apparatus for the detection of submarines and more particularly to a high-speed towed sonar system for underwater acoustical detection of submarines from a towing vehicle.

The detection and location of submerged submarines was for a long period of time almost exclusively accomplished by the use of underwater acoustical apparatus or sonar gear carried by surface vessels. More recently, schemes were devised to permit aircraft to search for and systematically locate submerged submarines. One of the systems devised for the detection and location of submerged submarines from aircraft involved the use of submersible listening devices commonly known as sonobuoys. These sonobuoys were expendable listening devices which were to be dropped from the aircraft in desired patterns. When the buoy reached the surface of the water, an acoustical transducer was automatically lowered to a preselected submerged depth, and electrical signals produced by acoustic activation of the transducer would be relayed by a radio transmitter in the buoy to an appropriate radio receiver in the aircraft, whereby propeller noises generated by submarines in the area could be detected from aircraft flying overhead. By suitable placement of a plurality of such sonobuoys and evaluation of the intensity of character of underwater sounds detected at the several sonobuoys, the approximate location of the submerged target could be determined.

More recently, sonar buoy systems have been devised wherein a sonar unit was lowered into the water from the aircraft and sonic frequency signals propagated in a generally directional pattern would be transmitted under water from the sonar buoy, the echoes reflecting from submerged objects being received by a transducer and relayed by a radio transmitter to a receiver in the aircraft. The received signals in such instances could be presented in such a way as to indicate both the general direction and approximate range of the echo producing target from the sonar buoy.

Both the sonobuoys systems and the sonar buoy systems were obviously not readily adaptable to rapid submarine search from aircraft over large sea areas because the transducer carrying buoys were designed to be dropped or lowered to a stationary position in the water and did not have extensive underwater range.

Attempts have been made to expand the range of sonar search systems by towing a sonar transmitter and receiver from an aircraft to which the sonar unit is mechanically connected. However, the use of towed sonar systems for the detection of submarines has been drastically limited by the self-induced noise generated in towing. The blanketing effect of local water noise due to the speed of the sonar carrier under water severely limited the range of the sonar detection signal. This led to the development of the dip sonar ball used in conjunction with a hovering helicopter to insure zero relative velocity between the sonar ball and the water. This development eliminated the problem of self-induced noise, but the effective rate of search was much less than the rate which could be theoretically accomplished by towed sonar operating at average speeds from 25 to 60 knots. Information presently available indicates that current towed sonar units are not effective at towing speeds above 18 to 20 knots due to the self-induced noise problem.

Substantial increases could be made in the present underwater search rates through the use of a moving sonar towed by a fast moving towing vehicle, such for example, as flying aircraft. In addition to the self-induced noise problem, however, another limitation to the effective use of towed sonar is the inability to tow a sonar from an airplane because the minimum speed of any airplane used today is greater than the maximum usable speed of the sonar. At speeds in the vicinity of 60 knots, the sonar containers have shown extreme pitching instability.

An object of the present invention is the provision of a sonar unit designed to be towed by a fast moving towing vehicle, which would overcome the problem of self-induced noise and permit average search rates in the vicinity of 60 knots.

Another object of the present invention is the provision of a sonar unit to be towed from a vehicle at optimum vehicle speed, wherein a submerged sonar transmitting and receiving unit may be periodically towed at very low speeds below the level at which local water noise substantially reduces sonar effectiveness during the period of transmission and reception of sonar signals while the towing vehicle is moving at a relatively constant higher speed.

Another object of the present invention is the provision of a novel method and apparatus for under-water sonar searching by flying aircraft wherein a towed submerged sonar unit may be propelled at speeds varying substantially above and below the speed of the towing aircraft.

While the sonar system of the present invention may be drawn through the water, by a towing vehicle moving on the water, underwater, or in the air, the ensuing description of the invention will be directed primarily to specific applications where the sonar is towed by flying aircraft.

Other objects, advantages and capabilities of the present invention will become apparent from the following detail description, taken in conjunction with the accompanying drawings illustrating one preferred embodiment of the invention.

In the drawings:

FIGURE 5 is a diagrammatic illustration of the mechanical and electrical connections between certain components of the primary and satellite paravanes.

The present invention in general includes a towed trailing or listening ear unit housing the sonar transmitter and receiver which is to be towed at an underwater level, and a primary or lead unit forming the towing source for the trailing unit and having an intermittent drive mechanism to which a tow cable from the training unit is connected for intermittently paying out and retrieving the tow cable in such manner that the resultant underwater velocity of the trailing listening ear unit may be materially reduced relative to the velocity of the lead unit to a near zero speed relative to the water during the period the sonar signal is transmitted and received by adjusting the rate of pay-out of the tow cable. The lead unit carrying the intermittent drive mechanism may be a surface or airborne towing vessel, as a ship or airplane, or may be another underwater container such as a paravane or the like towed by the towing vessel. Thus the sonar satellite unit will reduce to a speed which will provide substantially zero-speed sonar effectiveness during the pay out of the satellite tow line and may increase in speed up to a level considerably greater than the speed of the towing vehicle during retrieving of the tow cable to provide an average search rate corresponding to the speed of the towing vehicle which may be much greater than the average search speed allowable if the speed of the sonar unit was not cyclically variable relative to towing vehicle speed.

Figure 2:
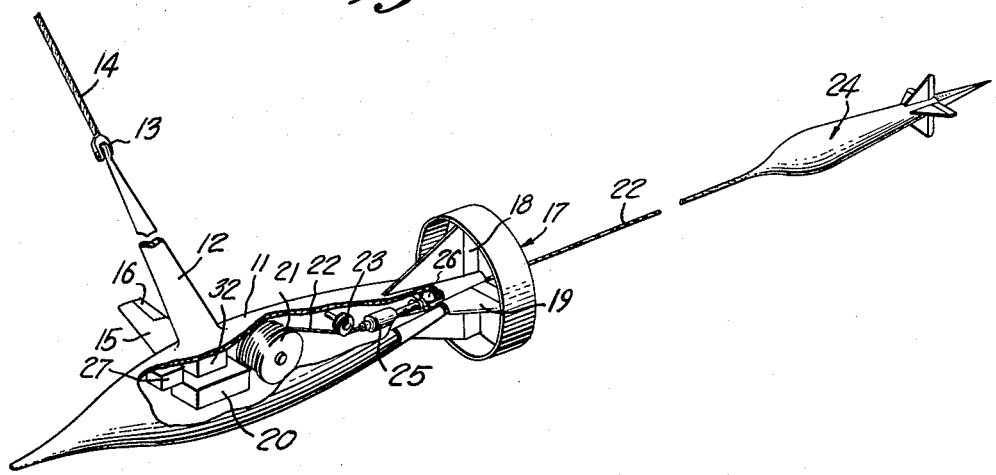
FIGURE 2 is a perspective view of a submerged primary paravane for use in practicing the present invention.

The invention will be more fully understood by reference to the accompanying drawings illustrating one effective specific form of the invention wherein the sonar unit is directly towed by an underwater lead or primary unit which in turn is towed by an airborne towing vessel. The high-speed towed sonar system embodying the present invention, in this exemplary form, is towed at selected submerged depths by a helicopter or other towing vehicle 10 capable of operating effectively at speeds in the vicinity of 60 knots, and includes a primary or lead unit in the form of an underwater container such as a paravane, indicated generally by the reference character 11, of generally streamlined shape designed to operate at a selected depth below the surface by having an elongated upwardly inclined rigid tow fin 12 of sufficient length to project from the selected depth of operation of the paravane, ranging preferably about 5 to 15 feet below the water surface, to a position above the surface of the water where it is coupled by a suitable cleavis joint as indicated at 13 to a coaxial primary tow cable 14 extending to the helicopter or other towing vehicle 10. The primary paravane 11 should be designed to provide effective stability when moving in water at speeds in the range of optimum velocity of the towing vehicle, for example 50 to 75 knots for present day helicopters, and to this end may be provided with hydrofoils 15 extending oppositely from the sides of the paravane at a position approximately amidships having ailerons 16 incorporated therein, together with a shrouded tail guidance assembly 17 including rudders 18 and elevators 19 to stabilize the primary paravane 10 about the pitch and yaw axes and maintain the desired attitude and depth below the water surface. The primary paravane 11 should contain batteries, control equipment and transmission devices capable of feeding information to the helicopter. Preferably, synthetic stability devices of a gyroscopic nature sensitive to rates of change in the motion path of the paravane are provided to continuously maintain depth and stability in pitch and yaw of the paravane, an automatic pilot unit 20 housed in the paravane 11 being illustrated in the drawing as indicative of the depth and attitude control facility which may be used in the primary paravane 11. A suitable reel 21 having an associated drive mechanism is provided within the primary paravane 11 and supports a satellite cable 22 which is trained about a guide pulley 23 and extends rearwardly through the trailing end of the primary paravane 11 to a satellite sonar carrier or listening ear unit 24. A suitable electric generator 25 driven by a water turbine indicated diagrammatically at 26 in FIGURE 2 may also be provided in the primary paravane 11 together with a battery 27 to provide the electrical energy for the sonar unit.

It will be understood, of course, that where an aircraft or surface vessel is directly connected to the satellite tow cable 22 to draw the satellite carrier 24 through the water without the use of an intermediate primary paravane 11, the reel 21 and associated drive mechanism will be mounted in the towing vessel and the complex problems of effective stabilization of an underwater drive mechanism carrier moving at high speeds are avoided.

Figure 3:
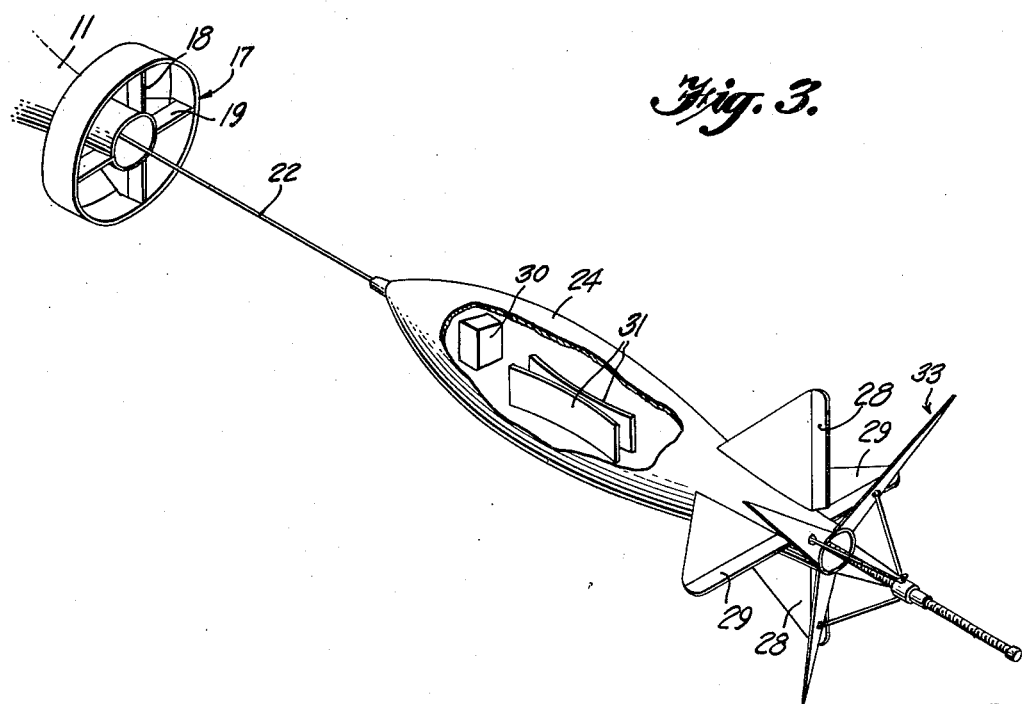
FIGURE 3 is a perspective view of a satellite sonar carrier for use with the present invention which may be selectively payed-out in trailing relation behind the primary or lead unit or retrieved into a close proximity to the primary unit.

The satellite sonar carrier 24 is illustrated more particularly in FIGURE 3 and is also of a generally streamlined configuration having rudders 28 and elevators 29 at the trailing end thereof for governing depth and attitude of the satellite carrier 24. The satellite carrier also houses an automatic pilot unit 30 to sense rate of change in the motion path of the satellite carrier and control the rudder 28 and elevators 29. Sonar transducers 31 are provided in the satellite carrier 24 which are activated by electical signals generated for example in a sonar transceiver 32 housed in the primary paravane 11 and connected by electrical leads through the satellite towing cable 22 to the transducers 31. Additionally, a quick opening drag device such as the type illustrated in FIGURE 3 and identified by the reference character 33 may be provided at the rear end of the satellite sonar carrier 24 to rapidly brake the speed of the satellite carrier in the water during the pay-out of the satellite tow cable 22.

The reel 21 is driven to retrieve the satellite carrier 24 toward the primary paravane by a suitable drive mechanism, powered for example by the water turbine 26, and may be controlled from the helicopter or towing vehicle 10 or automatically cycled intermittently by known means to alternately release the reel 21 to pay out cable and to activate the reel to retrieve the satellite sonar carrier 24 at selected speeds and repetition rates related to the speed of the primary paravane 11 through the water. For example, with a reel-out cable 22 of 200 feet, and a towing vehicle speed of 60 knots, the satellite 24 could be payed out at a rate such as to produce a speed of from 5 to 10 knots relative to the water, and during this period of 5 to 10 knots waterspeed, the sonar transceiver 32 could be activated to transmit and receive the sonar signal during approximately a two second interval. Signals representative of the echoes sensed by the transducers 31 would be carried to the transceiver 32 through the satellite tow cable 22 and from there to the helicopter 10 through the coaxial tow cable 14.

Figure 4:
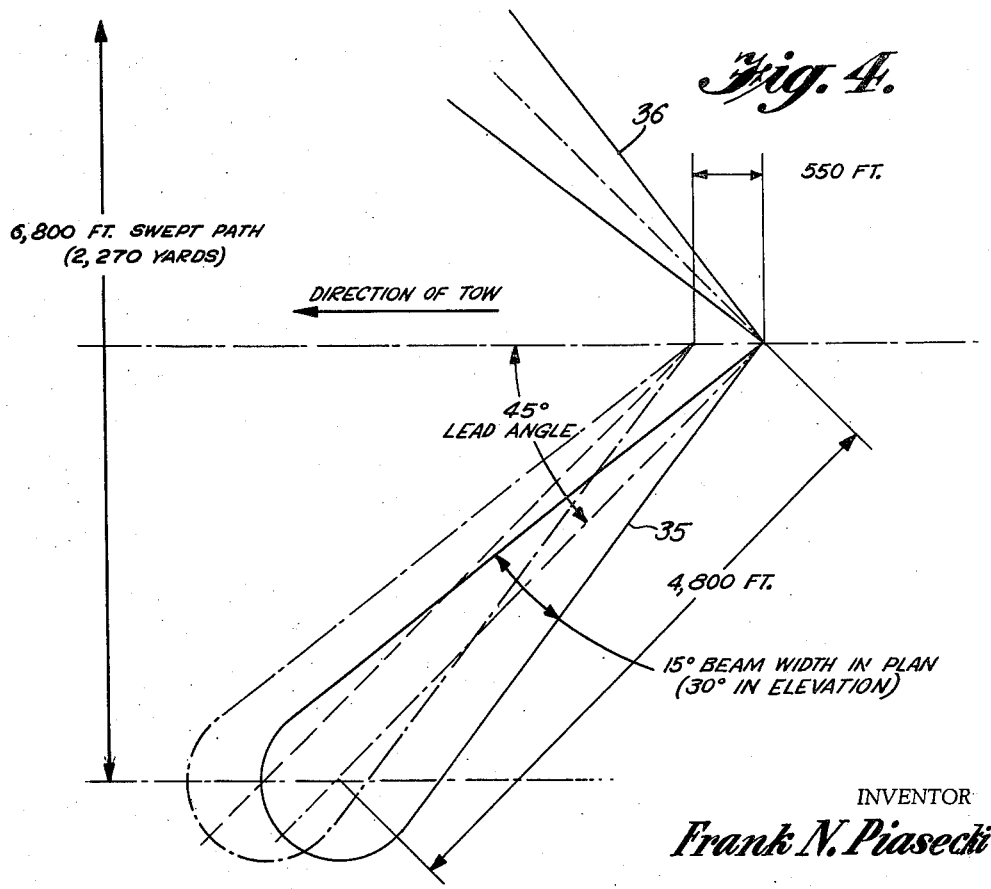
FIGURE 4 is a diagrammatic illustration in plan of the radiation pattern for the sonar system at two successive transmission positions along a search path.

To retrieve the satellite sonar carrier 24, the reel-in mechanism associated with the reel 21 and powered by the water turbine 26 would reel in the satellite cable 22 at a selected rate, for example, about 57 feet per second. Assuming a cycle repetition rate of 5.5 seconds, during which the primary paravane 11 is moving 550 feet at a speed of 60 knots, the satellite carrier 24 would move through the water during a reel-in period of 3.5 seconds at a speed of about 94 knots and no sonar signals would be generated or received during this phase of the cycle. However, full range coverage could be achieved, by way of example, by an arrangement as diagrammatically illustrated in plan in FIGURE 4, wherein the transducers are disposed to radiate sound energy in laterally diverging patterns, indicated at 35 and 36, having a 15° beam width in plan and a 30° beam width in elevation with the principal beam axis at a 45° lead angle extending to opposite sides of the axis of travel of the paravane. By this arrangement, assuming an effective sonar range of 4,800 feet, a path 6,800 feet or 2,270 yards in width be swept by the sonar unit with full coverage over all but the 1,000 feet immediately to each side of the carrier 24, which zone could be effectively covered by other sonar gear.

Figure 1:
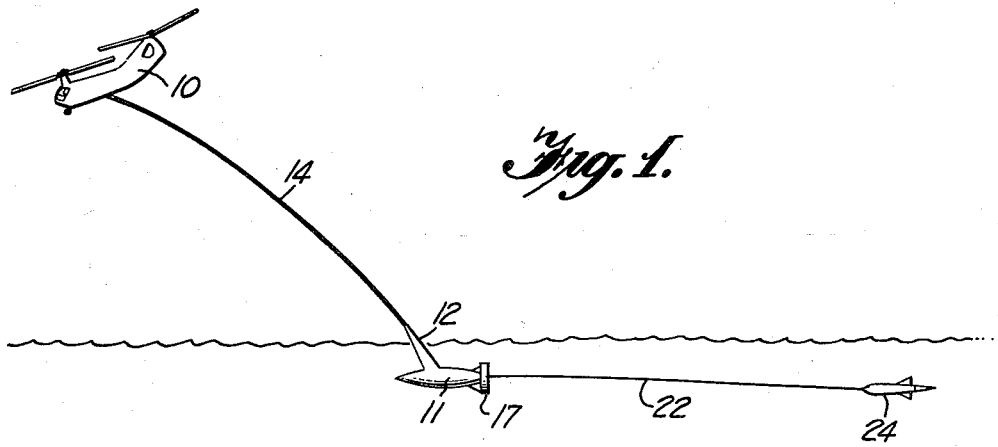
FIGURE 1 is a diagrammatic view of a high-speed towing sonar system embodying the present invention in an attitude of use for sonar search purposes.

FIGURE 1 diagrammatically illustrates the above-described high-speed towed sonar system in action, wherein the primary paravane 11 is being drawn through the water at an assumed speed of about 60 knots at a distance of from five to fifteen feet below the surface of the water. The satellite sonar carrier 24 will be periodically payed out in trailing relation to the primary paravane 11 and, for example, by use of known drag or braking mechanisms to immediately decelerate the satellite carrier 24 and by the use of known means for adjusting the rate of payout of the satellite tow cable 22 from the reel 21, the satellite carrier can be caused to promptly assume a speed of about ten knots in the water for a period of, for example, two seconds while the primary paravane 11 is still moving forward at a speed of 60 knots. During this two-second interval, the sonar transceiver 32 in the primary paravane 11 may be caused to activate the transducers 31 in the satellite carrier 24 to transmit a sonar signal in a beam pattern similar to that illustrated in FIGURE 4 and receive echoes therefrom. During the next three and one-half seconds, the reel 21 will be driven to rapidly retrieve the satellite tow cable 22 and draw the satellite carrier 24 into close proximity to the primary paravane 11. The attitude and depth below the surface of the water of the two towed bodies is of course continuously regulated by the automatic pilots or other suitable motion path sensing and control means provided in the towed bodies. By provision of suitable automatic pilot controls in the satellite sonar carrier 24, the carrier 24 may be caused to assume a variety of selected depths during the period of sonar signal transmission and reception. Suitable adjustment in the times allotted to various phases of the cycle may be required if the operating depths of the carrier 24 is substantially below that of the primary paravane 11, however, in order to provide for a suitable period during pay-out of the satellite tow cable 22 required for the carrier 24 to assume the selected depth.

It will be appreciated that the usual methods of automatically regulating the guidance means responsive merely to the position of the towed object below the surface of the water, as by measuring the depth of the towed object by water pressure, will not be adequate at the high speeds at which the underwater containers of this sonar system will operate. At such high speeds, the reaction of the towed body to changes in angle of attack produced by an adjustment of the guidance system would immediately generate large forces which can accelerate the body vertically or laterally such that when a change of position is measured by the depth instrument it is too late to stop its motion. This would result in continuously increasing sets of oscillations or porpoising until either the tow cable snaps or the body leaps out of the water. In order to provide appropriate intelligence information to permit the automatic control means for the guidance system to proportion the control motion so as to supply a force of the proper magnitude to balance the deviating force and maintain proper position of the towed body at high speeds, the rate of change of angular velocity or angular rate of change of position of the body relative to its tow path or to some other reliable reference must be obtained. It is preferable that measurement of the angular rate of change be made by means of gyros or other accelerometer type of instrumentation.

The primary paravane 11 may be constructed so as to have a rearwardly opening cavity in the trailing end thereof of appropriate size and configuration to accommodate the satellite sonar carrier 24 therein, so that the sonar carrier 24 may be drawn by the reel mechanism 21 into nested relation with the primary paravane when desired. It will be appreciated, however, that other arrangements may be provided to cause only part of the carrier 24 to be nested in the trailing end of the paravane 11 or to cause the carrier 24 to be positioned wholly to the rear of the primary paravane 11.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A system for detecting submerged submarines from an aircraft flying overhead along a selected search path at a search rate in excess of about 50 knots comprising a primary paravane adapted to be lowered into submerged position from the aircraft and drawn through the water by the aircraft at a selected, substantially uniform underwater velocity and submerged depth, said primary paravane having means automatically responsive to depth, course and attitude deviations of the primary paravane for maintaining the primary paravane at the selected subsurface depth, course and attitude, a satellite paravane adapted to be drawn through the water by said primary paravane in trailing relation to said primary paravane, said satellite paravane including sonar transmitting and receiving means for radiating sonar signals along preselected axes extending outwardly from said satellite paravane and receiving signals reflected from underwater objects in the path of said sonar signals, a tow line mechanically connecting said satellite paravane with said primary paravane, a reel in said primary paravane for winding and unwinding the tow line to alternately retrieve said satellite paravane toward said primary paravane and to cause said satellite paravane to retreat from said primary paravane, means to derive power from the waterstream in the course of travel of the primary paravane through the water to activate the reel in a direction to wind the tow line and propel the satellite paravane at a velocity exceeding that of the primary paravane, means for activating the reel to cause the satellite paravane to retreat from the primary paravane to ssume a water speed of less than about 20 knots, said sonar means being adapted to transmit and receive said signals only during said retreat period, and means for communicating signals indicative of the reflected sonar signals received by said receiving means to the towing aircraft.

2. The combination recited in claim 1, wherein said satellite paravane also includes means for maintaining the same at a selected depth, course and attitude, the means of each of said paravanes for maintaining depth, course and attitude, including pitch and yaw axis guidance means and control means responsive to changes in the motion path of the associated paravane including means for measuring the angular change of position and the angular rate of change of position of the associated paravane relative to a selected reference axis to regulate said guidance means and govern the depth and attitude of said paravanes.

3. Sonar apparatus adapted to be lowered into submerged position from aircraft in flight at selected substantially uniform speeds and towed through the water for detecting the presence of submerged objects in the water comprising a primary body of elongated streamlined configuration adapted to be drawn through the water by the towing aircraft at a selected, substantially uniform underwater velocity corresponding to the aircraft speed and at a selected subsurface depth, said primary body having means automatically responsive to depth, course and attitude deviations of the primary body for maintaining the primary body at the selected subsurface depth, course and attitude, a secondary body adapted to be drawn through the water by said primary body in trailing relation to said primary body at a subsurface depth near that of the primary body, said secondary body including sonar transmitting and receiving means for radiating sonar signals along preselected axes extending outwardly from said secondary body and receiving signals reflected from underwater objects in the path of said sonar signals, a tow line mechanically connecting said secondary body with said primary body, means in said primary body for winding and unwinding the tow line to alternately retrieve said secondary body toward said primary body at a speed exceeding the velocity of said primary body during a selected retrieve period and then paying out said tow line to cause said secondary body to assume a preselected low velocity relative to the water of less than a selected threshold speed above which self-induced noise from relative movement of the sonar unit in the water materially reduces effective sonar range during a selected retreat period, said sonar means being adapted to transmit and receive said signals only during said retreat period, and means for communicating signals indicative of the reflected sonar signals received by said receiving means to the towing aircraft.

4. Sonar apparatus adapted to be lowered into submerged position from aircraft in flight at selected substantially uniform speeds and towed through the water for detecting the presence of submerged objects in the water comprising a primary body of elongated streamlined configuration adapted to be drawn through the water by the towing aircraft at a selected, substantially uniform underwater velocity corresponding to the aircraft speed and at a selected subsurface depth, said primary body having means automatically responsive to depth, course and attitude deviations of the primary body for maintaining the primary body at the selected subsurface depth, course and attitude, and said primary body including a rigid fin member extending upwardly from the body at a point intermediate the length of the body to a position above the surface of the water when the primary body is located at said selected subsurface depth, a tow cable for connecting the primary body to the aircraft, coupling means on an upper end portion of said fin member to be continuously located above the surface of the water for coupling the primary body to said tow cable, a secondary body adapted to be drawn through the water by said primary body in trailing relation to said primary body at a subsurface depth near that of the primary body, said secondary body including sonar transmitting and receiving means for radiating sonar signals along preselected axes extending outwardly from said secondary body and receiving signals reflected from underwater objects in the path of said sonar signals, a tow line mechanically connecting said secondary body with said primary body, means in said primary body for winding and unwinding the tow line to alternately retrieve said secondary body toward said primary body at a speed exceeding the velocity of said primary body during a selected retrieve period and then paying out said tow line to cause said secondary body to assume a preselected low velocity relative to the water of less than a selected threshold speed above which self-induced noise from relative movement of the sonar unit in the water materially reduces effective sonar range during a selected retreat period, said sonar means being adapted to transmit and receive said signals only during said retreat period, and means for communicating signals indicative of the reflected sonar signals received by said receiving means to the towing aircraft.

5. Sonar apparatus adapted to be lowered into submerged position from aircraft in flight at selected substantially uniform speeds and towed through the water for detecting the presence of submerged objects in the water comprising a primary paravane adapted to be drawn through the water by the towing aircraft at a selected, substantially uniform underwater velocity corresponding to the aircraft speed and at a selected subsurface depth, said primary paravane having means automatically responsive to depth, course and attitude deviations of the primary paravane for maintaining the primary paravane at the selected subsurface depth, course and attitude, and said primary paravane including a rigid fin member extending upwardly from the paravane at a point intermediate the length of the paravane to a position above the surface of the water when the primary paravane is located at said selected subsurface depth, a tow cable for connecting the primary body to the aircraft, coupling means on an upper end portion of said fin member to be continuously located above the surface of the water for coupling the primary paravane to said tow cable, a satellite paravane adapted to be drawn through the water by said primary paravane in trailing relation to said primary paravane, said satellite paravane including sonar transmitting and receiving means for radiating sonar signals along preselected axes extending outwardly from said satellite paravane and receiving signals reflected from under water objects in the path of said sonar signals, a tow line mechanically connecting said satellite paravane with said primary paravane, means in said primary paravane for winding and unwinding the tow line to alternately retrieve said satellite paravane toward said primary paravane at a speed exceeding the velocity of said primary paravane during a selected retrieve period and then paying out said tow line to cause said satellite paravane to assume a preselected low velocity relative to the water of less than a selected threshold speed above which self-induced noise from relative movement of the sonar unit in the water materially reduces effective sonar range during a selected retreat period, means for activating said sonar means to transmit and receive said signals only during said retreat period, and means for communicating signals indicative of the reflected sonar signals received by said receiving means to the towing aircraft.

6. The combination recited in claim 5, wherein said satellite paravane also includes means for maintaining the same at a selected depth, course and attitude, the means of each of said paravanes for maintaining depth, course and attitude including pitch and yaw axis guidance means and control means responsive to changes in the motion path of the associated paravane including means for measuring the angular change of position and the angular rate of change of position of the associated paravane relative to a selected reference axis to regulate said guidance means and govern the depth and attitude of said paravanes.

References Cited in the file of this patent
UNITED STATES PATENTS

| | | |
|---|---|---|
| 1,487,138 | Atwood | Mar. 18, 1924 |
| 1,690,578 | Hammond | Nov. 6, 1928 |
| 2,324,378 | Flude | July 13, 1943 |
| 2,353,360 | Ronning | July 11, 1944 |
| 2,465,696 | Paslay | Mar. 29, 1949 |
| 2,987,029 | Manuel | June 6, 1961 |
| 3,005,973 | Kietz | Oct. 24, 1961 |

FOREIGN PATENTS

| | | |
|---|---|---|
| 165,893 | Sweden | Jan. 13, 1959 |